United States Patent [19]
Kubo et al.

[11] Patent Number: 5,198,934
[45] Date of Patent: Mar. 30, 1993

[54] MAGNETIC DISK DEVICE INCLUDING A SLIDER PROVIDED WITH A SOLID PROTECTING LAYER WHICH DETERMINES THE DISTANCE BETWEEN A MAGNETIC GAP AND A MAGNETIC DISK RECORDING DEVICE

[75] Inventors: Masahiro Kubo, Tokyo; Yasuo Ohtsubo, Yokohama, both of Japan

[73] Assignee: Kabushiki Kaisha Toshiba, Kawasaki, Japan

[21] Appl. No.: 819,675

[22] Filed: Jan. 13, 1992

Related U.S. Application Data

[60] Continuation of Ser. No. 707,436, May 28, 1991, abandoned, which is a continuation of Ser. No. 458,404, Dec. 28, 1989, abandoned, which is a continuation-in-part of Ser. No. 153,480, Feb. 2, 1988, Pat. No. 4,901,185, Division of Ser. No. 884,098, Jul. 10, 1986, abandoned.

[30] Foreign Application Priority Data

Jul. 19, 1985 [JP] Japan .................. 60-159352
Jul. 19, 1985 [JP] Japan .................. 60-159353

[51] Int. Cl.$^5$ ............................................. G11B 5/48
[52] U.S. Cl. ........................... 360/104; 360/103; 360/122; 360/105
[58] Field of Search ............... 360/102, 103, 104, 122, 360/129, 106

[56] References Cited

U.S. PATENT DOCUMENTS

| | | | |
|---|---|---|---|
| 4,130,847 | 12/1978 | Head et al. | 360/103 X |
| 4,327,387 | 4/1982 | Plotto | 360/103 |
| 4,796,126 | 1/1989 | Tsuchiya et al. | 360/103 |
| 4,811,142 | 3/1989 | Nakashima et al. | 360/103 |
| 4,901,185 | 2/1990 | Kubo et al. | 360/122 X |
| 5,083,365 | 1/1992 | Matsumoto | 360/122 X |

FOREIGN PATENT DOCUMENTS 0250880  11/1986  Japan ................... 360/103

OTHER PUBLICATIONS

IBM Technical Disclosure Bulletin, vol. 20 No. 3, Aug. 1977 Trirail Slider With Low-Profile Center Rail, McWhinney.

*Primary Examiner*—Andrew L. Sniezek
*Attorney, Agent, or Firm*—Oblon, Spivak, McClelland, Maier & Neustadt

[57] ABSTRACT

A slider of a magnetic disk device has a main body and a protecting layer coated on the main body. The protecting layer has first flat surface which faces the magnetic recording surface of the rotatable disk and which extends in a tangential direction of the disk when the slider is located adjacent to the magnetic recording surface of the disk. The contact region of the first surface is in contact with the magnetic recording surface of the rotatable disk. Thus, a frictional force produced between the magnetic recording surface and the first flat surface is reduced, and the damage to the magnetic recording surface can be prevented. According to the present invention, the damage to the magnetic recording surface of the disk can be prevented, and the variation in distance between the magnetic recording surface and the magnetic head can be remarkably reduced. As a result, the recording density of data recorded on the magnetic disk can be increased.

10 Claims, 7 Drawing Sheets

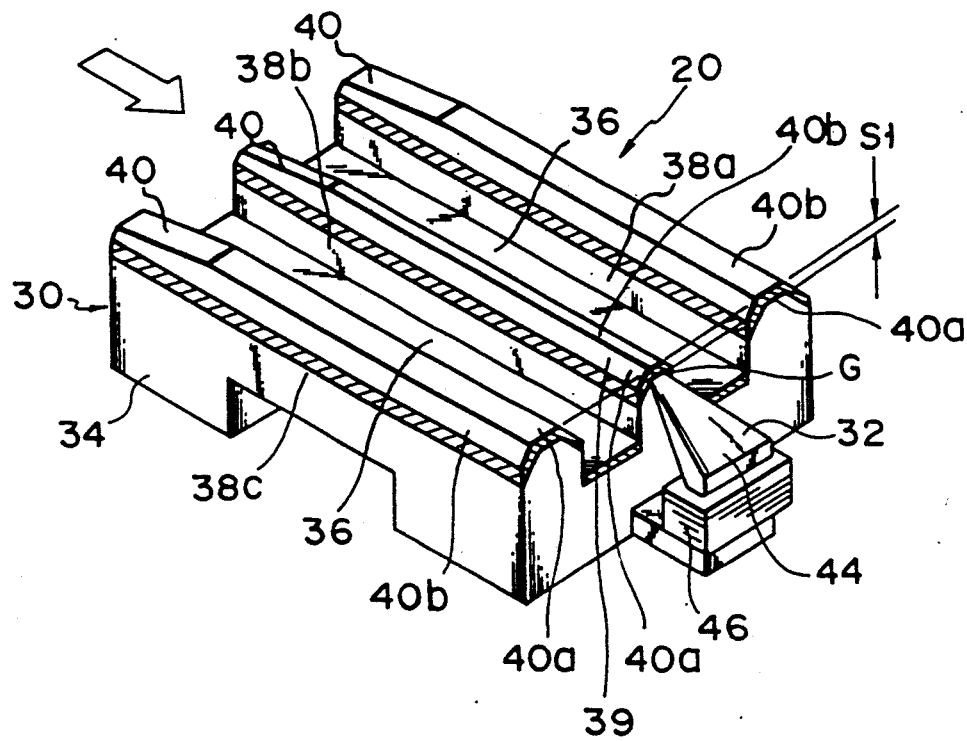
F I G. 6
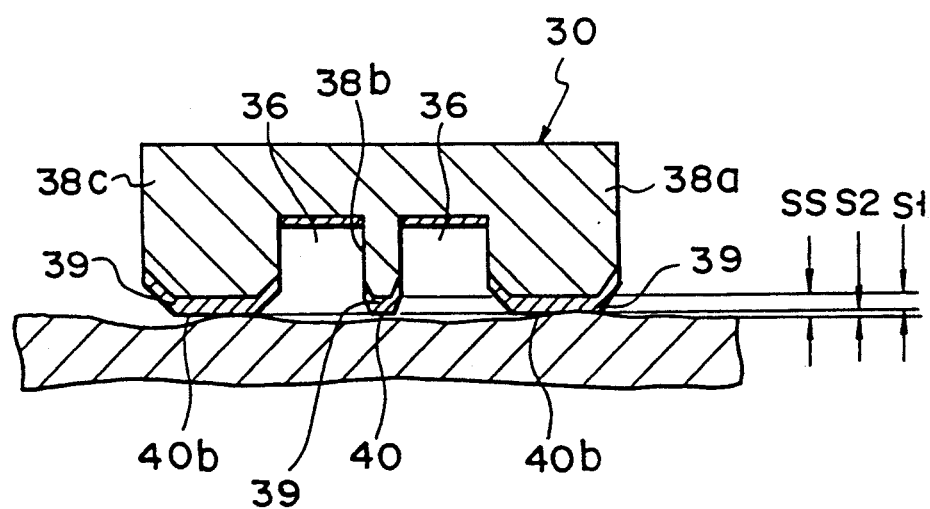
F I G. 7

MAGNETIC DISK DEVICE INCLUDING A SLIDER PROVIDED WITH A SOLID PROTECTING LAYER WHICH DETERMINES THE DISTANCE BETWEEN A MAGNETIC GAP AND A MAGNETIC DISK RECORDING DEVICE

This application as a continuation of U.S. Pat. application Ser. No. 07/707,436, filed on May 28, 1991, now abandoned which is a continuation of U.S. Pat. application Ser. No. 07/458,404 filed on Dec. 28, 1989 now abandoned which is a continuation-in-part of U.S. Pat. application Ser. No. 07/153,480 filed on Feb. 2, 1988 and which is now U.S. Pat. No. 4,901,185 which was a divisional application of U.S. Pat. application Ser. No. 06,884,098 filed on Jul. 10, 1986 and which has been abandoned.

BACKGROUND OF THE INVENTION

1. Field of the Invention

The present invention relates to a magnetic disk device and, more particularly, to a magnetic disk device using a hard disk.

2. Description of the Related Art

Magnetic disk devices have been in widespread use and are popular as external storages. A magnetic disk device includes a magnetic disk, a motor for rotating the magnetic disk, a slider radially movable along the magnetic disk, and a magnetic head mounted on the slider to perform data read and write operations with respect to the magnetic disk.

In a prior art magnetic disk device using a hard disk, a magnetic head floats above the magnetic recording surface of the hard disk during data read/write accessing of the hard disk. More specifically, the slider for supporting the magnetic head thereon has a shape which generates an airflow between the slider and the hard disk. The slider connected to the magnetic head is subject to a dynamic pressure generated by an airflow such that the slider floats above the magnetic recording surface of the hard disk at a predetermined distance. For example, the slider receives a predetermined force from a means such as a spring element and is urged toward the hard disk. The slider, and hence the magnetic head, are located in a floating position where the biasing force of the spring is balanced with the slider's dynamic pressure generated by the airflow.

A large demand has arisen in recent years for a magnetic disk device which increases the recording density of the magnetic disk. In order to respond to this demand, a vertically magnetized recording system has been proposed. If this system is applied to the conventional magnetic disk device of a hard disk type, the distance between the magnetic recording surface of the hard disk and the magnetic head must be 0.1 μm or less. Variations in this distance must be minimized as much as possible.

Since the slider of the prior art magnetic disk device floats above the magnetic recording surface of the hard disk by means of the dynamic pressure of the airflow generated between the slider and the hard disk, the floating position of the slider, i.e., of the magnetic head, varies greatly in accordance with disturbances such as vibrations which act upon the magnetic disk device. It is, therefore, impossible under prior methods to reduce the distance between the magnetic head and the magnetic recording surface of a hard disk since variations in distance therebetween must be kept within the allowable range. As a result, even if a vertically magnetized recording method is used, the recording density cannot be sufficiently increased.

Further, when the disk is static, the air bearing surface of the slider is put in contact with the magnetic recording surface of the disk. Thus, when the rotation of the disk is started or stopped, a largely varying contact force is produced between the air bearing surface of the slider and the magnetic recording surface of the disk. Since the disk is rotated and stopped frequently, the magnetic recording surface of the disk may considerably be damaged by the repeated application of the largely varying contact force.

SUMMARY OF THE INVENTION

An object of the present invention is to provide a magnetic disk device wherein the damage to the magnetic recording surface of a disk is prevented, and a variation in distance between the magnetic recording surface and the magnetic head is remarkably reduced, whereby the recording density of data recorded on the magnetic disk can be increased.

According to the present invention, there is provided a magnetic disk device used with a rotatable disk of a rigid type, which has a magnetic recording surface on at lest one side surface thereof and which rotates in one direction, comprising:

a slider including, (a) a main body having a second surface facing the magnetic recording surface of the disk, and (b) a protecting layer which is coated on the second surface the main body, and which has a first flat surface which faces the magnetic recording surface of the rotatable disk and which extends in a tangential direction of said disk when said slider is located adjacent to the magnetic recording surface of the rotatable disk, the first flat surface having a contact region adapted to contact the magnetic recording surface, a magnetic head provided on said slider, and having a magnetic gap to perform data read and write operations on the magnetic recording surface of the rotatable disk; and contacting means for bring the contact region of the first surface into contact with the magnetic recording surface of the rotatable disk.

According to the magnetic disk device of the present invention, the contacting means can always bring the contact portion of the slider into contact with the magnetic recording surface of the magnetic disk during rotation of the magnetic disk, i.e., during operation of the device. The head distance between the magnetic gap in the magnetic head and the magnetic recording surface of the magnetic disk corresponds to the sum of the value representing the flatness of the magnetic recording surface and the distance between the contact region of the slider and the magnetic gap in the magnetic head. This head distance is devoid of influence from noise, such as that caused by vibrations. According to state-of-the-art machining techniques, it is relatively easy to reduce the distance to 0.08 μm or less, and the value representing variances in the flatness of the magnetic recording surface to 0.02 μm or less. According to the magnetic disk device of the present invention, the head distance can be set to be 0.1 μm or less, which is required for performing vertically magnetized recording on the magnetic recording surface of a magnetic disk. In addition, variations in head distance can be minimized by contact of the slider directly with the magnetic disk. Therefore, by using a magnetic disk device of the present invention, data can be written on the magnetic recording surface of the magnetic disk at a high density. That is, the memory capacity of the magnetic disk can be increased significantly by performing vertically magnetized recording (high density recording) on the magnetic recording surface. In addition, data can be easily read from the magnetic recording surface of the magnetic disk.

Further, a protecting layer (e.g., a lubricating layer) is coated on the main body of the slider, and a first flat surface of the protecting layer is brought into contact with the disk. Consequently, a frictional force between the magnetic recording surface and the first flat surface can be reduced, and the magnetic recording surface is protected from damage.

Therefore, in the present invention, the damage to the magnetic recording surface of the disk is prevented, and a variation in distance between the magnetic recording surface and the magnetic head is remarkably reduced, whereby the recording density of data recorded on the magnetic disk can be increased.

If the magnetic head is located at a space apart from the contact region of the slider by a predetermined distance in a direction away from the recording surface of the magnetic disk, the surface of the magnetic head is not brought directly into contact with the magnetic disk. Thus, the surface of the magnetic head is free from wear caused by contact with the magnetic disk, and is not damaged thereby. Therefore, the service life of the magnetic disk device can be prolonged If the length of the contact region contacting the magnetic disk is small and the magnetic head is located on the slider at trailing surface in view of the rotational direction of the magnetic disk, variations in head distance can be even further minimized.

BRIEF DESCRIPTION OF THE DRAWINGS

FIGS. 6 and 7 show a slider according to a modification of the first embodiment, FIG. 6 being a perspective view of the slider, and FIG. 7 being a cross-sectional view of the slider;

DETAILED DESCRIPTON OF THE PREFERRED EMBODIMENTS

Figure 1:
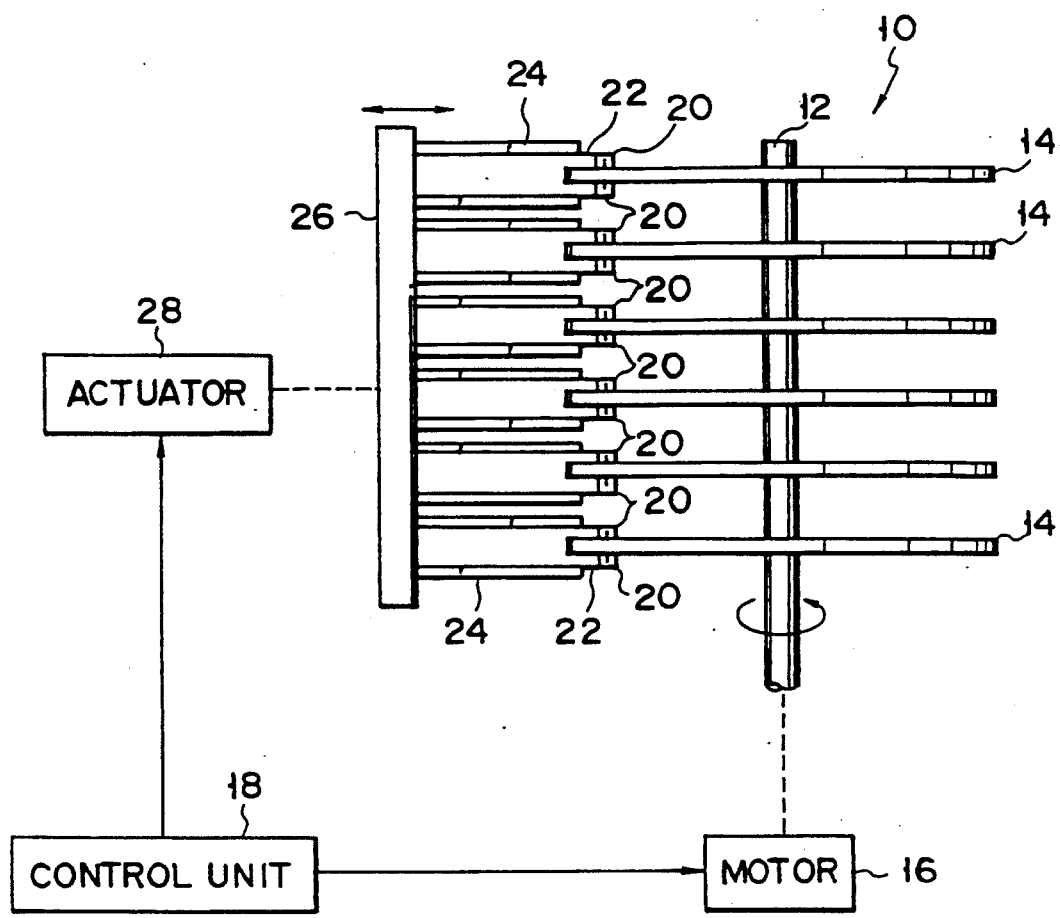
FIG. 1 is a schematic view of a magnetic disk device according to a first embodiment of the present invention.
Figure 2:
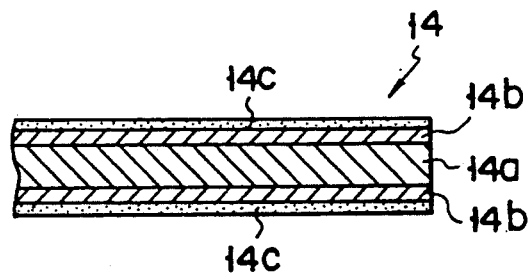
FIG. 2 is a sectional view showing part of a magnetic disk used in the device of FIG. 1.

FIG. 1 schematically shows a magnetic disk device utilizing a hard disk. The magnetic disk device comprises disk stack 10. Stack 10 includes spindle 12 and six magnetic disks 14 mounted on spindle 12. Disks 14 are equally spaced apart from each other along the axial direction of spindle 12. As shown in FIG. 2, each disk 14 comprises circular substrate 14a of a metal such as an aluminum alloy, perpendicular magnetic recording layers 14b formed on both surfaces of substrate 14a, and lubricant layers 14c respectively formed on layers 14b. Two lubricant layers 14c are formed by applying a lubricant to the corresponding recording layers 14b. However, a solid lubricant may be applied to recording layers 14b. The thickness of lubricant layers 14c will be described later. The upper magnetic recording layer 14b of the uppermost disk with respect to motor 16 (i.e., uppermost disk 14 in FIG. 1) is used to detect the angular positions of all six disks 14, and all other recording layers 14b of all disks 14 (including the lower layer of the uppermost disk) are used for data recording.

One end of spindle 12 is connected to motor 16. Thus, spindle 12 and disks 14 are rotated in synchronism with the rotation of motor 16. Motor 16 is electrically connected to control unit 18, which controls the rotational speed of motor 16.

A pair of head units 20 are located near both surfaces of each disk 14, so as to sandwich disk 14 therebetween. The magnetic disk device has a total of twelve head units 20. Units 20 are arranged on a line parallel to spindle 12.

Each head unit 20 is coupled to a common carriage 26 through gimbal arm 22 and access arm 24. Carriage 26 is coupled to actuator 28 driven by control unit 18, and is moved by actuator 28 in the directions of the arrow in FIG. 1. Motor 16 and actuator 28 are controlled by control unit 18 according to a known technique.

Figure 3:
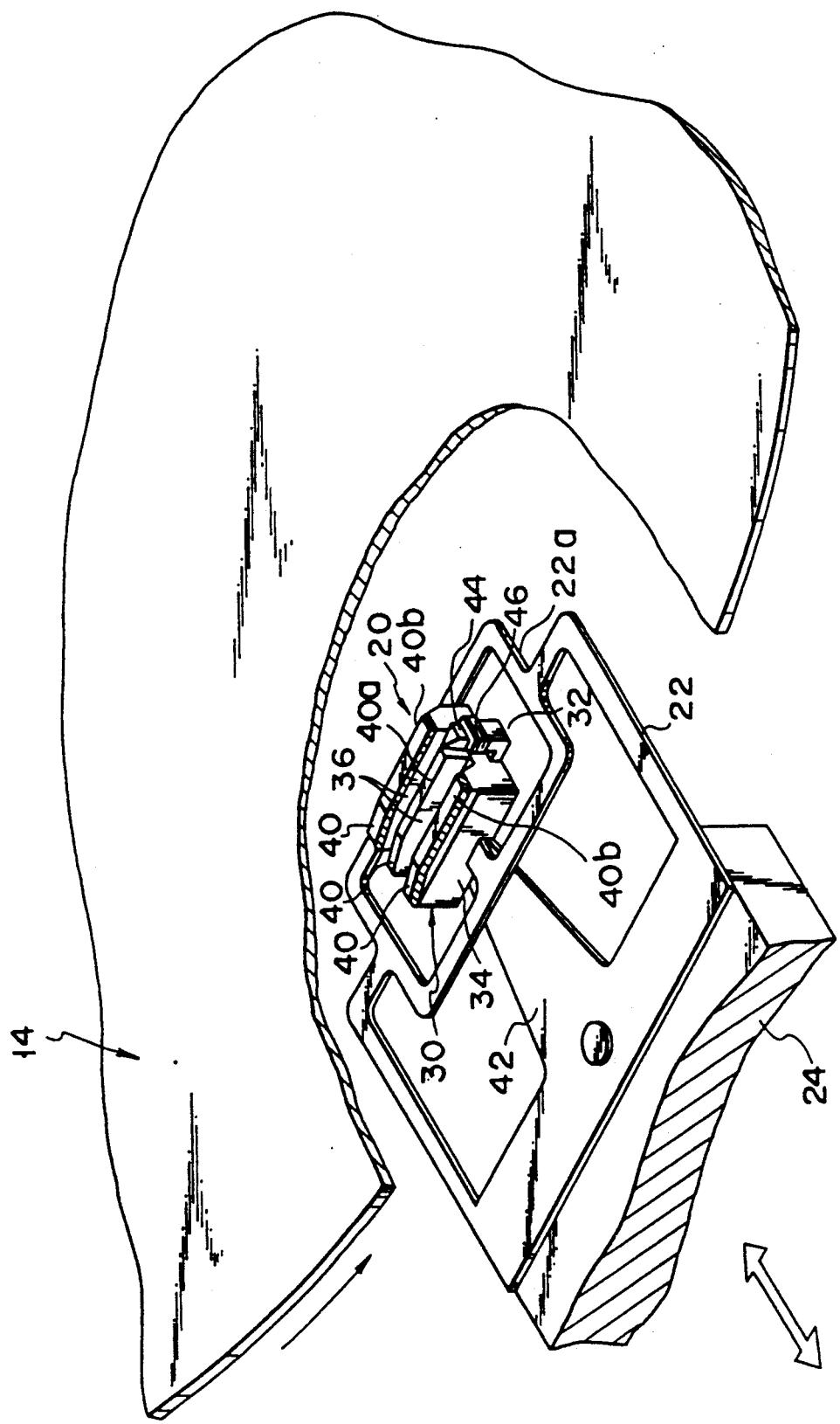
FIG. 3 is a perspective view showing a slider support mechanism in the device of FIG. 1.
Figure 4:
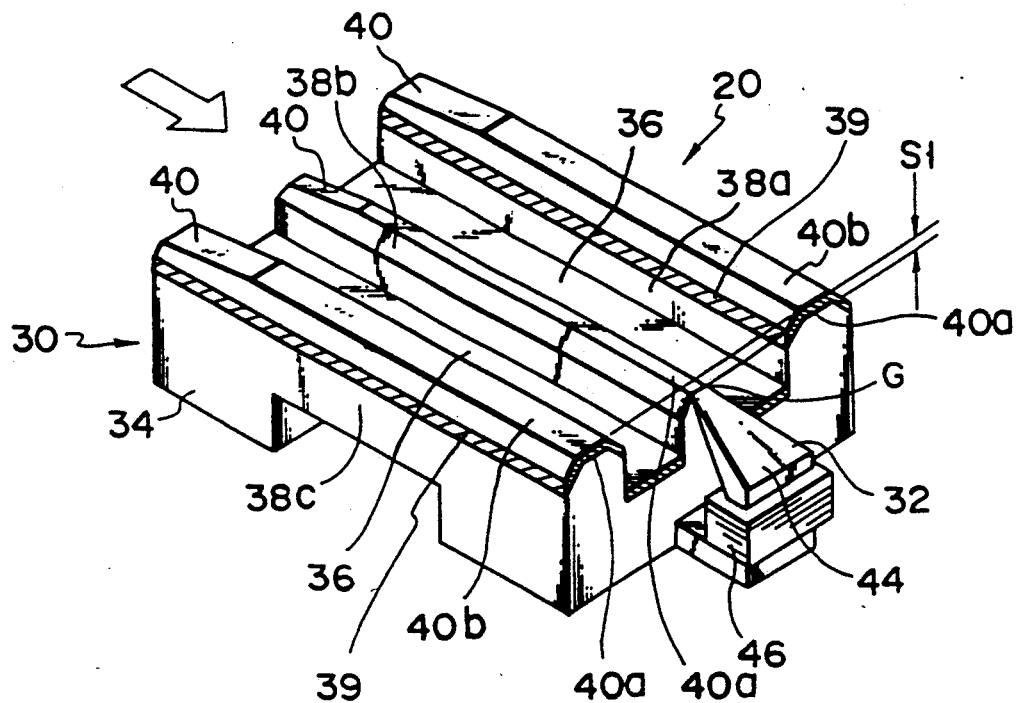
FIG. 4 is an enlarged perspective view of the slider in FIG. 3.

The head units 20 have an identical structure, which is best shown in FIGS. 3 and 4. Each head unit 20 comprises slider 30 and magnetic head 32. Slider 30 comprises rectangular parallelepiped block or main body 34. Slider 30 is supported by gimbal spring 22a of gimbal arm 22 such that the longitudinal axis of block 34 is perpendicular to that of gimbal arm 22. Two parallel grooves 36 are formed on the surface of block 34 following the rotational direction of disk 14. These grooves 36 define three projections 38a, 38b, and 38c on the surface of block 34.

Leaf spring 42 is integrally formed with gimbal arm 22 to bring the first flat surfaces 40b of slider 34 into contact with the magnetic recording surface of disk 14.

Magnetic head 32 is a vertically magnetic recording head mounted on the trailing surface of slider 30 in view of the rotational direction of disk 14. In this embodiment, magnetic head 32 includes a magnetic core (not shown) integrally embedded in the trailing surface of projection 38b of slider 30, magnetic gap G thus defined within the magnetic core, yoke 44 fixed at the trailing side of slider 30 and being magnetically coupled to the magnetic core, and coil 46 wound around yoke 44. It should be noted that gap G is located on the same plane as flat surface 40a of projection 38b of the slider 30. Whole magnetic head 32 may be embedded in slider 30.

The thickness of each of the lubricant layers 14c of disks 14 is greater than the maximum clearance necessary between the magnetic recording layer 14b and the slider 30, i.e., larger than the maximum clearance necessary between first flat surfaces 40b and magnetic recording layer 14b when slider 30 is contacting the disk surface.

Figure 5:
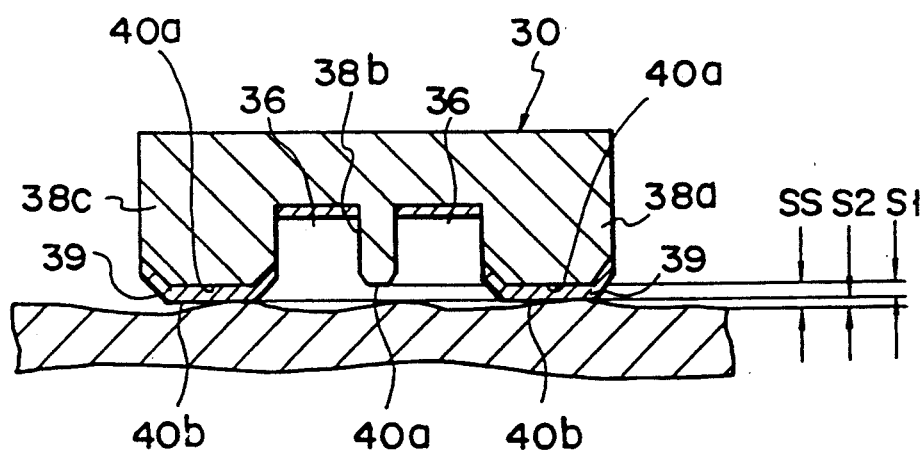
FIG. 5 is a sectional view of the slider in FIG. 4.

Further, according to the first embodiment of the present invention, as best shown in FIGS. 4 and 5, a protecting layer 39 is formed by sputtering on the projections 38a and 38c. The protecting layer 39 is a lubricating layer formed, for example, of carbon or an oxide (zirconium, $SiO_2$). The upper surface of the protecting layer 39 is defined as a first flat surface 40b. As will be described later, the first flat surface 40b is a contact region that is put in contact with the disk while the disk is being rotated.

Upper surfaces of the projections 38a, 38b and 38c, i.e., second flat surfaces 40a, are formed on a level with each other. Magnetic gap G (described later) of the magnetic head 32 is set on a level with the second flat surface 40a of the central projection 38. Further, the thickness (or height) of the protecting layer 39 is S1 (about 0.02 $\mu m$). Accordingly, a distance S1 is defined between the gap G and the first flat surface 40b.

These leading surfaces of projection 38b and protecting layer 39, when viewed in terms of the rotational direction of disk 14, include inclined surfaces 40. In this case, each surface 40 gradually angles away from the direction of disk 14 on the leading surface of block 34.

According to the magnetic disk device of the first embodiment, sliders 30 of the pair of head units 20 cooperated with each disk 14 are always in contact with corresponding magnetic recording layers 14b of the disk by the action of leaf springs 42 of gimbal arms 22, irrespective of rotation of disk 14. More specifically, the flat surfaces 40b of projections 38a and 38b of slider 30 are always in contact with magnetic recording layer 14b of the corresponding disk 14. Therefore, surfaces 40b of each slider 30 serve as contact surfaces relative to disk 14 while disk 14 is rotated. Magnetic gap G of the magnetic head 32 is located within the same plane as that of flat surface 40a of projection 38b of slider 30, thereby gap G does not contact recording layer 14b of disk 14. In other words, a predetermined head distance Ss is always maintained between gap G and layer 14b. Distance Ss is a sum of the distance S1 between flat surfaces 40b and gap G and the value S2 representing variances in the flatness of the disk surface. According to state-of-the-art machining techniques known such as etching, it is relatively easy to limit the distance S1 to be equal to or less than 0.08 $\mu m$. It is also easy to limit the maximum value of the variances in flatness of the disk surface to be within 0.02 $\mu m$ or less. Therefore, the head distance Ss (as the sum of distances S1 and S2) can be limited to be within 0.1 $\mu m$ or less. During operation of the magnetic disk device, i.e., rotation of disk 14, the two flat surfaces 40b of slider 30 of each head unit 20 are always in contact with disk 14. Head distance Ss does not vary significantly, even if disturbances such as vibrations act upon the magnetic disk device. Head distance Ss can be accurately limited to be 0.1 $\mu m$ or less, and at the same time, variations in the distance Ss can be minimized. As a result, head unit 20 in the magnetic disk device can effectively perform vertically magnetized recording on the magnetic recording layer 14b of disk 14.

In the magnetic disk device of the present invention, since the pair of flat surfaces 40b of slider 30 of head unit 20 are always in contact with corresponding magnetic recording layer 14b of disk 14, wear of layer 14b must be taken into consideration. Assume that the area of the pair of flat surfaces 40b of slider 30 is, e.g., 8 mm$^2$, and that the force of leaf spring 42 acting on slider 30 is 16 g. A force acting on disk 14 is thus a maximum of about 2 g/mm$^2$. Since such a small force acts on disk 14, wear of recording layers 14b can be sufficiently minimized by forming lubricant layers 14c on the corresponding magnetic recording layers 14b of disk 14.

Further, in the first embodiment, since the first flat surface 40b is defined by the protecting layer 39, the small frictional force is further reduced. Thus, the prevention of the damage to the magnetic recording surface is further ensured.

The height of the protecting layer is S1. This height is variable in the sputtering process. For example, S1 is variable, for example, in a range from 0.01 $\mu m$ to 0.08 $\mu m$. Thus, the distance S1 between the gap G and the first flat surface 40b is freely selectable, and the distance S1 is easily adjustable. Namely, the spacing of gap G is controlled by the thickness of the protecting layer.

Another means for minimizing wear of the magnetic recording layer 14b in disk 14 is to reduce the rotational speed of the disk 14. In this case, since the magnetic disk device can write data on the recording layer 14b of disk 14 according to the vertically magnetizing recording scheme, the memory capacity of disk 14 can be increased by several times at least compared with that of a disk which is written by the conventional in-plane recording method. Therefore, even if the rotational speed of disk 14 is reduced, the bit density of data recorded in recording layer 14b of disk 14 can be increased a satisfactory amount.

FIGS. 6 and 7 show a modification of the first embodiment. The protecting layer 39 is also formed on the upper surface (or second flat surface 40a) of the central projection 38b. A first flat surface 40b, which is put in contact with the rotating magnetic disk, is defined on the upper surface of the protecting layer 39. In addition to the aforementioned advantages, this modification has the following advantages.

There is a case wherein the slider is distorted. In FIGS. 4 and 5, since the projections 38a and 38c are disposed on both sides of the slider 30, the first flat surfaces 40b of projections 38a and 38c are largely displaced from predetermined positions. Thus, there is a concern that the distance between the gap G and the first flat surface 40b is kept constant. As a result, the spacing of gap G is not kept constant.

The gap G is located on the downstream side of the first flat surface 40b of protecting layer 39 of central projection 38b. Thus, the spacing of gap G is defined by the thickness of protecting layer 39. Even if the slider is distorted, the position of the first flat surface 40b of the protecting layer 39 is unchanged. Thus, in this modification, even if the slider is distorted, the spacing of gap G is exactly set to a predetermined value. The magnetic disk device according to this modification is therefore suitable for high-density recording medium.

Moreover, since the spacing of gap G is defined by the thickness of the protecting layer 39 of central projection 38b, the spacing of gap G can be set more exactly, than in the case of FIGS. 4 and 5.

Figure 8:
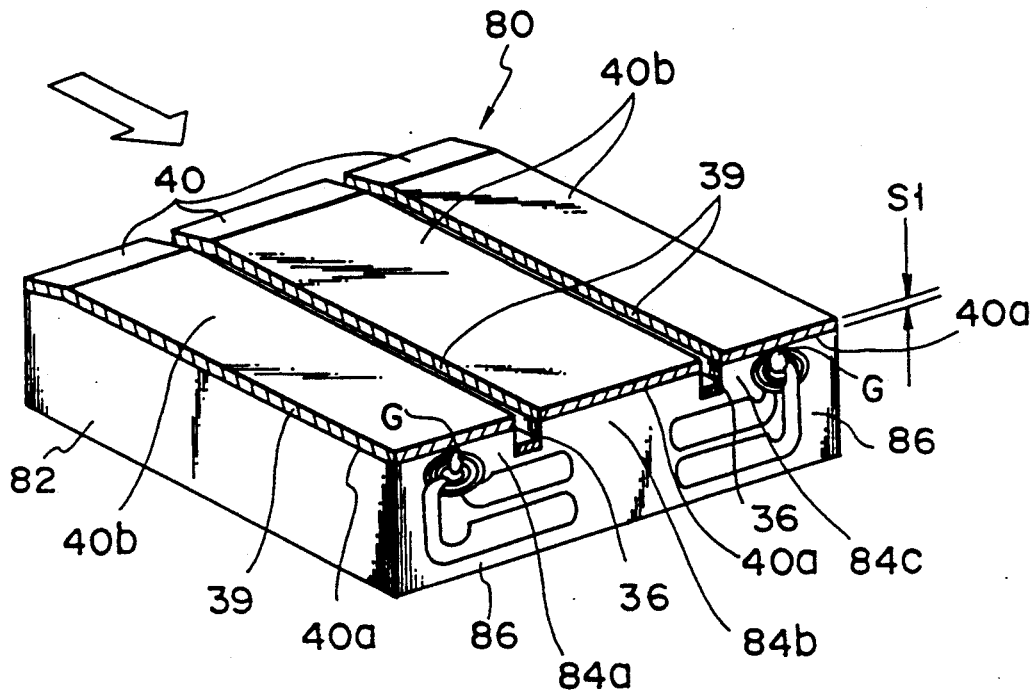
FIG. 8 is a perspective view showing a slider according to a second embodiment of the invention.

FIG. 8 shows a magnetic head device according to a second embodiment of the present invention. The magnetic head device of the second embodiment is a thin-film magnetic head 80.

A slider 82 has two grooves 36, and three projections 83a, 84b and 84c are defined by the two grooves 36. The upper surfaces (i.e., second flat surfaces 40a) of three projections 84a, 84b and 84c are formed on a level with each other. Gaps G of two magnetic heads 86 are set on a level with the projections 84a to 84c.

A protecting layer 39 is coated on each of the upper surfaces (i.e., second flat surfaces 40a) of projections 84a, 84b and 84c. Upper surfaces of the protecting layers 39 define first flat surfaces 40b which are put in contact with the rotating magnetic disk.

Thus, according to the second embodiment, too, the damage to the magnetic recording surface of the disk can be prevented, and a variation in distance between the magnetic recording surface and the magnetic head can be remarkably decreased. Therefore, the recording density of data recorded on the magnetic disk can be increased.

The gap G is located on the downstream side of the first flat surfaces 40b of protecting layers 39 that are put in contact with the magnetic disk. Thus, the spacing of gap G is defined by the thickness of the protecting layers 39. The spacing of gap G can be set more exactly, than in the case of FIGS. 4 and 5.

Figure 9:
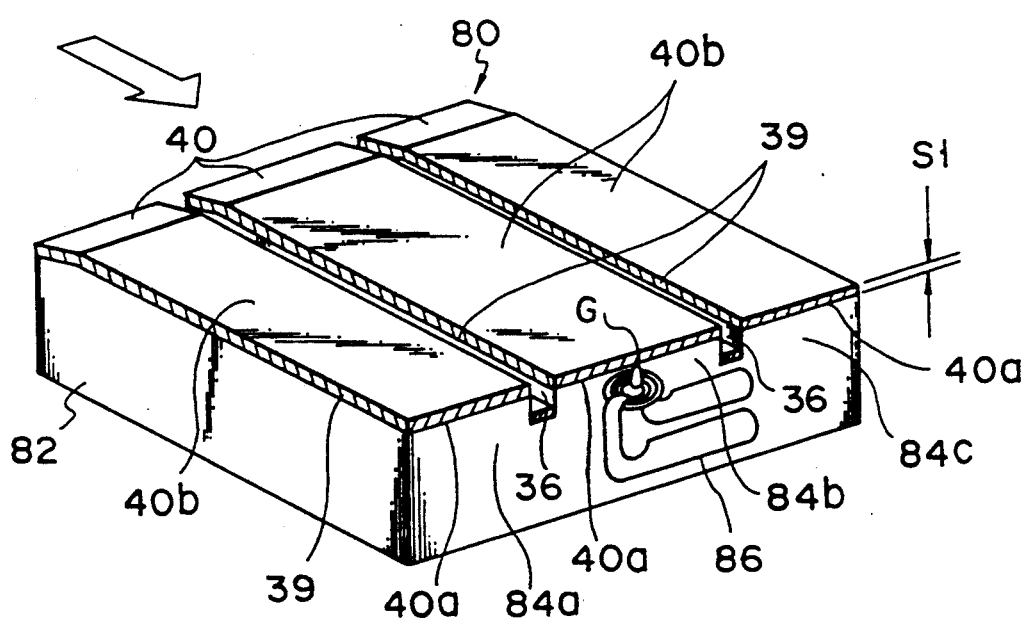
FIG. 9 is a perspective view of a slider according to a modification of the second embodiment.

FIG. 9 shows a modification of the second embodiment. In this modification, the gap G of one magnetic head 86 is located on the downstream side of the first flat surface 40b of protecting layer 39 of central projection 84b. This modification has the same advantages as the embodiment of FIG. 8. In addition, in this modification, like in the case of FIGS. 6 and 7, the error in spacing of gap G due to the distortion of the slider can be lessened.

Figure 10:
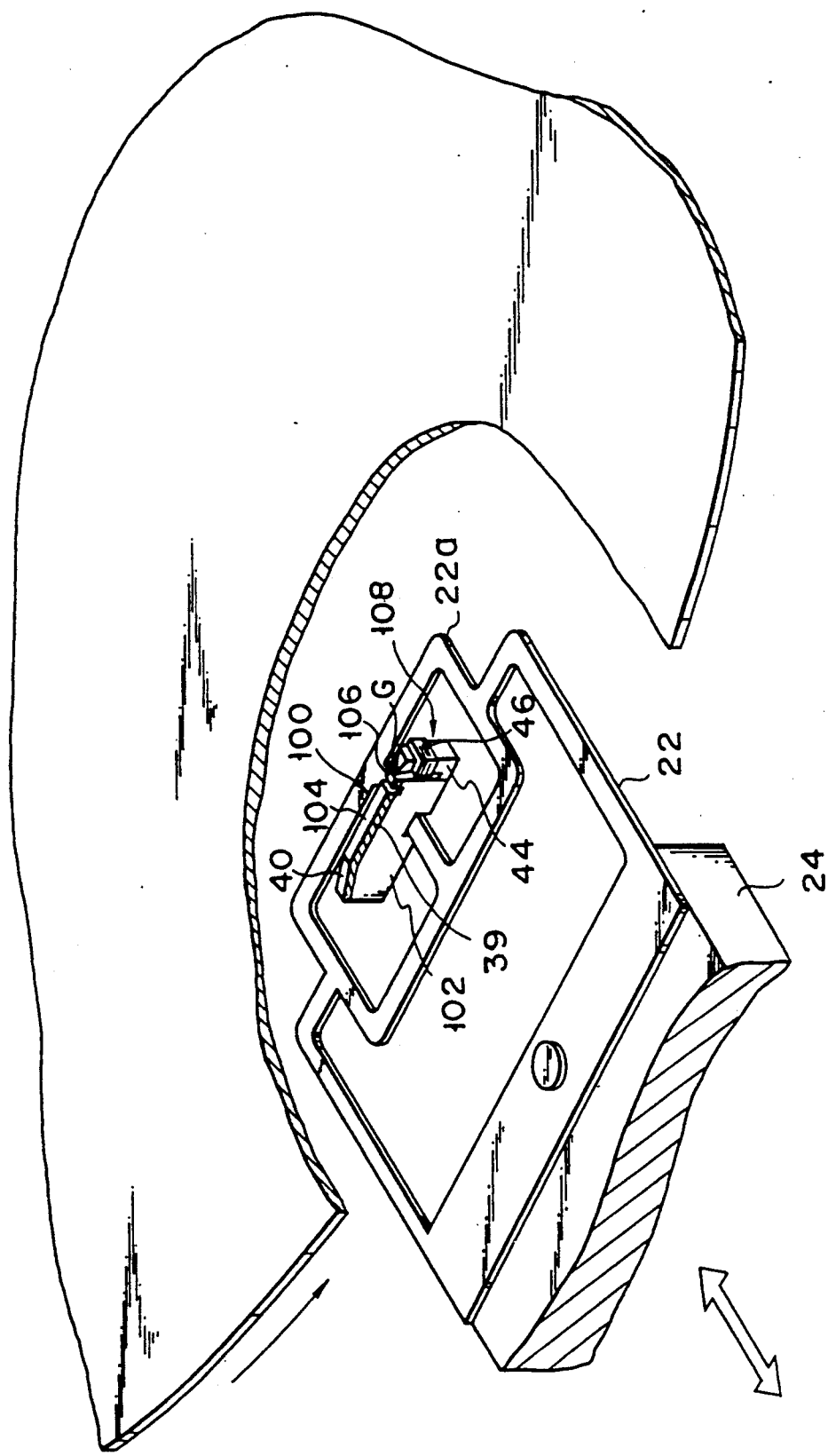
FIG. 10 is a perspective view showing a slider support mechanism according to a third embodiment of the present invention.
Figure 11:
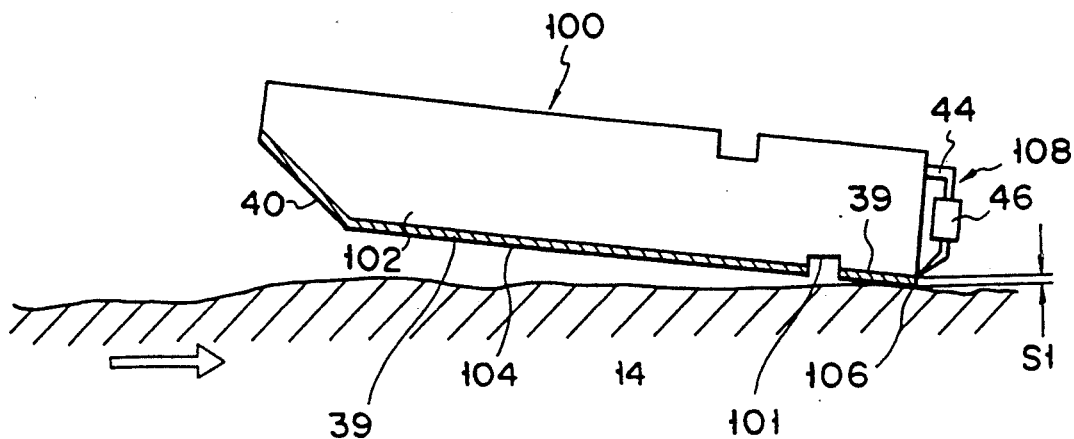
FIG. 11 is a side view of the slider in FIG. 10.
Figure 12:
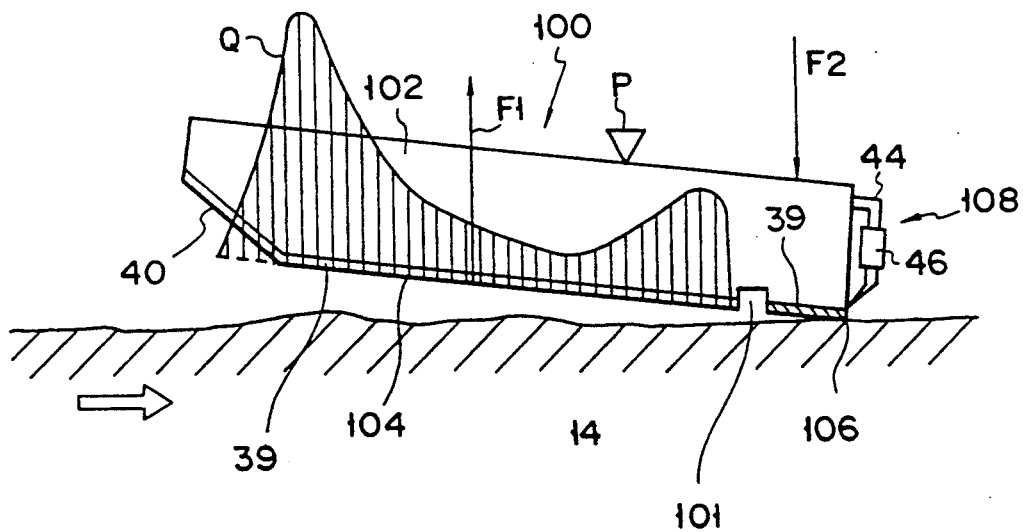
FIG. 12 is a side view showing a state wherein a force acts on the slider in FIG. 10.

FIGS. 10 to 12 show head unit 100 according to the third embodiment of the present invention. Slider 102 of head unit 100 has a small width. Protecting layer 39 is coated on that surface of slider 102 which faces the disk. Slider 102 has groove 101 in its surface across its width. Groove 101 divides protecting layer 39 into two surfaces, 104 and 106. Leading surface 104 includes inclined edge 40 located at the leading side of slider 102 when viewed with respect to the rotational direction of disk 14. Trailing surface 106 is located at the trailing side of slider 102 when viewed with respect to the rotational direction of disk 14. The area of trailing surface 106 is sufficiently smaller than that of the leading surface 104. In this embodiment, trailing surface 106 is inclined at a predetermined angle so that the leading edge of surface is farther from disk 14 than the trailing edge of the same surface. Slider 102 is supported by gimbal spring 22a of gimbal arm 22 in the same manner as in the previous embodiments. The pivotal point of slider 102 with respect to gimbal spring 22a deviates from the longitudinal center of slider 102 to a position near surface 106, as shown in FIG. 12.

In the third embodiment, a magnetic head 108 is attached to the trailing face of slider 102. Head 108 has substantially the same structure as head 32, except that the magnetic gap G of head 108 is displaced from the trailing surface 106 by distance S1 from disk 14. Distance S1 is equal to the thickness of protecting layer 39.

According to the third embodiment of the present invention the surface of slider 102 opposite disk 14 i.e., the leading surface 104 of slider 102, receives dynamic pressure Q generated by an airflow when disk 14 rotates. The magnitude of the dynamic pressure Q along the longitudinal direction of leading surface 104 is represented by the hatched region in FIG. 12, using leading surface 104 as a reference. The center of the dynamic pressure Q acting on leading surface 104 is represented by point A in FIG. 12. Point A is closer to the inclined surface 40 than pivot point P is.

When the dynamic pressure Q acts on slider 12 upon rotation of disk 14, force F1 acts on point A of the slider 102 so as to lift slider 102 from the magnetic disk 14. Since point A deviates from point P, a rotational force acts on slider 102 so as to rotate it about point P. As a result, as shown in FIGS. 11 and 12, trailing surface 106 located at the trailing side of slider 102 (when viewed with respect to the rotational direction of disk 14) is urged against the magnetic recording surface 14b of disk 14 by a predetermined force, i.e., force F2 producing the same magnitude at that moment as that of force F1, but acting in an opposite direction. Therefore, slider 102 is kept in contact with disk 14 through trailing surface 106, during the rotation of disk 14. Since the distance S1 is assured between the trailing surface 106 and the magnetic gap G of head 108, a constant distance of 0.1 $\mu$m or less is defined between the magnetic recording layer 14b of disk 14 and the magnetic gap G of the magnetic head 108 during operation, as is in the magnetic disk devices of the previous embodiments. Therefore, the data recording density of recording layer 14b of disk 14 can be increased.

Since the contact area between disk 14 and trailing surface 106 of slider 102 is small, slider 102 can be slid on disk 14 while the slider 102 follows the contour of the disk. As a result, the distance between the magnetic gap G of the magnetic head 108 and the magnetic recording layer 14b of the magnetic disk 4 can be more accurately controlled.

In this third embodiment, first flat surface 40b is defined by protecting layer 39. Thus, a relatively small frictional force is further reduced, and the damage to the magnetic recording surface can be further ensured.

Thus, the damage to the magnetic recording surface of the disk can be prevented, and the variation in distance between the magnetic recording surface and the magnetic head can be remarkably reduced. As a result, the recording density of data recorded on the magnetic disk can be increased.

Furthermore, gap G is located on the downstream side of first flat surface 40b of protecting layer 39 that is in contact with the magnetic disk. Thus, the spacing of gap G is defined by the thickness of protecting layer 39. Consequently, the spacing of gap G is set more exactly than in the case of FIGS. 4 and 5.

According to the third embodiment, dynamic pressure Q acting on slider 102 is utilized to urge trailing surface 106 of the slider 102 against the disk 14. Unlike as is in the first embodiment, the leaf spring 42 for causing gimbal spring 22a to bias slider 102 against magnetic disk 14 is unnecessary.

What is claimed is:

1. A magnetic disk device used with a rotatable disk of a rigid type, which has a magnetic recording surface on at least one side surface thereof, comprising:
   a slider including,
   (a) a main body with a front surface adjacent to the magnetic disk and a rear surface on the opposite side of the main body with respect to the front surface and positioned furthest from the magnetic disk, and
   (b) a solid lubricating protecting layer coated on at least a part of the front surface of the main body, projected away from the front surface of the main body toward the magnetic disk, and having a flat surface which faces the magnetic recording surface of the rotatable disk and which extends in a rotational direction with respect to said rotatable disk when said slider is located adjacent to the magnetic recording surface of the rotatable disk, said flat surface having a contact region which contacts the magnetic recording surface during read and write operations, (c) a magnetic head comprising a core member provided in said main body and a magnetic core member which is attached to said main body, and (d) a magnetic gap formed between one side of the magnetic core member of the magnetic head and a side of the core member provided in the main body to perform the read and write operations on the magnetic recording surface of the rotatable disk, a distance between a position of the magnetic gap closest to the medium and the contact region of the flat surface being set by the thickness of the solid protecting layer, to a predetermined value in a direction substantially perpendicular to the magnetic recording surface of the rotatable disk; and contacting means for bringing the contact region of the flat surface into contact with the magnetic recording surface of the rotatable disk during the read and write operations.

2. A device according to claim 1, wherein
the main body has at least one projection extending in the rotational direction of the rotatable disk,
the projection has the front surface located at a substantially same level with the position of the magnetic gap, and
the protecting layer of a predetermined thickness is coated on the front surface,
whereby the position of the magnetic gap is spaced apart from the contact region of the protecting layer, in the substantially perpendicular direction with respect to the magnetic recording layer, by the distance corresponding to the predetermined thickness.

3. A device according to claim 2, wherein the magnetic gap is provided between one side of the core member of the magnetic head and the other side of the core member provided in the main body, the magnetic gap located at the downstream side in the rotational direction of the rotatable disk.

4. A device according to claim 1, wherein the main body has three projections extending in parallel each other with respect to the rotational direction of the rotatable disk,
each projection has the front surface arranged at a substantially same level with the position of the magnetic gap, and
the protecting layer of a predetermined thickness is coated on the front surface of two side ones of the projections,
whereby the position of the magnetic gap is spaced apart from the contact region of the protecting layer in the perpendicular direction with respect to the magnetic recording layer, by the distance corresponding to the predetermined thickness.

5. A device according to claim 4, wherein
the protecting layer of a predetermined thickness is coated on the front surface of a central projection among the three projections, and
the magnetic gap is on one side of the core member of the magnetic head and the other side of the core member provided int he main body, the magnetic gap located at a downstream side in the rotational direction of the rotatable disk.

6. A device according to claim 1, wherein
the magnetic head is a thin-film type,
the main body has a plurality of projections extending in parallel each other with respect to the rotational direction of the rotatable disk,
each of the projections has the front surface the level of which is arranged at a position of the magnetic gap, and
the protecting layer of a predetermined thickness is coated on a selected front surface of the projections,
whereby the position of the magnetic gap is spaced apart from the contact region of the projecting layer, in the perpendicular direction with respect to the magnetic recording layer, by the distance corresponding to the predetermined thickness.

7. A device according to claim 6, wherein
said magnetic head has two magnetic head elements to constitute two separate magnetic head arrangements, each having respective magnetic gap between an associated magnetic head element and an associated projection, the respective magnetic gap being located at a downstream side in the rotational direction of the rotatable disk.

8. A device according to claim 6, wherein
the magnetic gap is provided between the magnetic head and one of the projections, the magnetic gap located at a downstream side in the rotational direction of the rotational disk.

9. A device according to claim 1, wherein
the contact region of the flat surface is located at a most downstream side in the rotational direction of the rotational disk,
the flat surface is also provided with an air bearing region for receiving an air bearing force produced by the rotation of the rotational disk and floating the air bearing region of the flat surface from the rotational disk, the air bearing region located on an upstream side in the rotational direction of the rotational disk, and
the contacting means includes pressing means for pressing the contact region of the flat surface upon the rotational disk against the air bearing force, thereby bringing the contact region into contact with the rotational disk,
whereby, when the disk is rotated and the magnetic head performs read and write operations, the air bearing region of the flat surface is floated from the rotational disk and the contact region of the flat surface is put in contact with the rotational disk.

10. A device according to claim 9, wherein said pressing means includes:
an access arm for reciprocating in the radial direction of the rotatable disk; and
a gimbal mechanism attached to the access arm, elastically supporting the slider, and pivotally supporting the slider at a predetermined support point in a surface located opposite to the air bearing region.

* * * * *